Aug. 6, 1968  A. J. WILTSHIRE ET AL  3,395,735

MOLDED CYLINDERS

Original Filed July 8, 1963  3 Sheets-Sheet 1

INVENTORS
ARTHUR J. WILTSHIRE
EDWARD C. PAVLOVICH

BY

Aug. 6, 1968  A. J. WILTSHIRE ET AL  3,395,735

MOLDED CYLINDERS

Original Filed July 8, 1963  3 Sheets-Sheet 3

INVENTORS
ARTHUR J. WILTSHIRE
EDWARD C. PAVLOVICH
BY

United States Patent Office 3,395,735
Patented Aug. 6, 1968

3,395,735
MOLDED CYLINDERS
Arthur J. Wiltshire and Edward C. Pavlovich, Cleveland, Ohio, assignors to Structural Fibers, Inc., Chardon, Ohio, a corporation of Ohio
Original application July 8, 1963, Ser. No. 293,381, now Patent No. 3,340,119, dated Sept. 17, 1967. Divided and this application Oct. 13, 1966, Ser. No. 604,497
1 Claim. (Cl. 138—141)

ABSTRACT OF THE DISCLOSURE

A molded, fiber-reinforced, resin-impregnated cylinder having a uniform wall thickness and precise circumferential tolerances. The cylinder consists of a plurality of concentric laminations of fibrous reinforcing sheets integrally bonded to each other and uniformly impregnated with a settable resin having a conductive materal dispersed within. Each concentric sheet has an edge-to-edge dimension equal to the circumference of that portion of the wall which forms. A longitudinally extending edge of each sheet is butted against its own opposite parallel edge, and each seam thereby formed is circumferentially spaced from each other seam in the laminated cylinder by a constant distance.

---

This is a division of application Ser. No. 293,381, filed July 8, 1963.

This invention relates generally to the manufacture of molded articles and, more specifically, pertains to hollow cylinders which are fabricated by preimpregnating porous, fibrous mats with a liquid resin which is subject to curing or setting by application of a setting agent such as heat, a catalyst, or both, and thereafter laying up the mats in the shape of the cylinder to be produced.

In particular, this invention constitutes an improvement in the molding apparatus and methods described in copending application Ser. No. 63,082, filed Oct. 17, 1960, now Patent No. 3,177,105.

According to the methods described in the above-identified application, hollow objects, such as open end tubes or cylinders, may be formed by a process including the steps of wrapping a single turn of appropriately shaped fiber matting, such as glass fiber matting of the required thickness, around an expandable mandrel to produce a cylindrical matting form. The cylindrical matting form is then layed up within a rigid mold casing by inserting the mandrel within the mold and expanding the mandrel and the matting form to position and compress the matting against the inner mold surface. The bottom of the rigid mold casing is closed by a mold casing cap and disk-shaped fiber matting piece is placed at the bottom of the cylindrical mold cavity. Upon contraction of the mandrel, clearance between it and the matting is provided, which facilitates withdrawal of the mandrel. After withdrawal of the mandrel, an expandable bag or envelope, or other fluid expandable membrane, which defines the shape of the finished article, is positioned within the laid-up form in the mold casing. The mold casing is then closed by clamping a rigid casing cap to the top of the mold casing. With the matting form and the bag thus assembled in the closed mold, a suitable, moderate pressure is created in the bag to expand the bag against the fiber form so as to hold the forms in place against the inner mold surface, and the fiber matting is partially permeated with a settable liquid resin which is introduced at the bottom of the mold. The disk-shaped fiber end piece provides a flow path between the resin inlet conduit and the cylindrical matting form. After the resin has been cured, the hollow molded article is removed from the mold and the closed end is cut or sawed away to form an open cylinder.

An alternate procedure set forth in the above-identified application contemplates the step of preimpregnating the cylindrical matting form, with the consequent elimination of the resin injecting step and the fiber disk. The application further contemplates the utilization of the expandable mandrel both for the purpose of positioning the cylindrical form in the mold and as a substitute for the separate inflatable envelope heretofore used to effect final compaction of the fiber matting in the mold and distribution of the resin therethrough.

Where a plurality of relatively thin mats were superimposed one on the other to produce the desired total thickness, the mats were positioned in offset relationship to provide oppositely formed, stepped edges. The stepped edges approximated the feathered or beveled edge of a single mat, and upon expansion of the mandrel, were intended to interlock to form a substantially smooth joint or seam.

A cylinder formed in accordance with this procedure is acceptable for many applications. Such a cylinder, however, is not acceptable for applications that require uniformity of wall thickness and precise circumferential tolerances, since the seam area of a cylinder formed in accordance with the above procedure may have a higher or lower fiber-to-resin ratio than the remainder of the cylinder. A high resin concentration in a thickened seam area may cause an out-of-round condition in a cylinder as the cylinder is cooled from the effective setting temperature of the resin. This is particularly true if styrene is combined with a polyester resin in amounts of up to 40 percent, since such a mixture may shrink up to 8 percent on cooling.

An object of this invention is to provide methods and apparatus for forming a cylinder having a uniform wall thickness and uniformly circular sections.

More particularly, the invention contemplates the provision of an improved method and apparatus for preimpregnating a plurality of superimposed mats with resin so that the resin will be uniformly distributed throughout the molded cylinder and laying up the impregnated mats in a cylindrical mold in an offset relationship so that the seams of the separate mats will be equally spaced about the periphery of the cylinder.

Cylinders produced in accordance with the teachings of this invention are particularly useful as mill roll cores for winding paper or sheeted plastic material, such as Mylar and cellophane, during manufacture of the sheet material. These materials are produced on a continuous basis and are wound on mill roll cores at a very high speed. A mill roll core that is out-of-round causes the paper or plastic film that is being wound to whip and this whipping action frequently breaks the material or causes it to crease on the roll.

Heretofore, mill roll cores were made from steel that was machined to precise tolerances. The steel cores eliminated the whipping problem but were difficult to handle and to drive because of their weight. Mill roll cores produced in accordance with the present invention, on the other hand, are round, inexpensive, light and, therefore, are easy to manipulate and drive.

If the cylinders produced in accordance with the present invention are to be used as mill roll cores, it is desirable to include a suitable conductive paste in the resin to function as a static electricity eliminator. A conductive paste, such as, for example, acetylene black, enables the mill roll core to conduct accumulations of static electricity to a suitable ground so that sparks will be minimized at the zone of separation between the film and the mill roll core.

These and other objects and advantages of the invention will become apparent from the following description and accompanying drawings.

Figure 1:
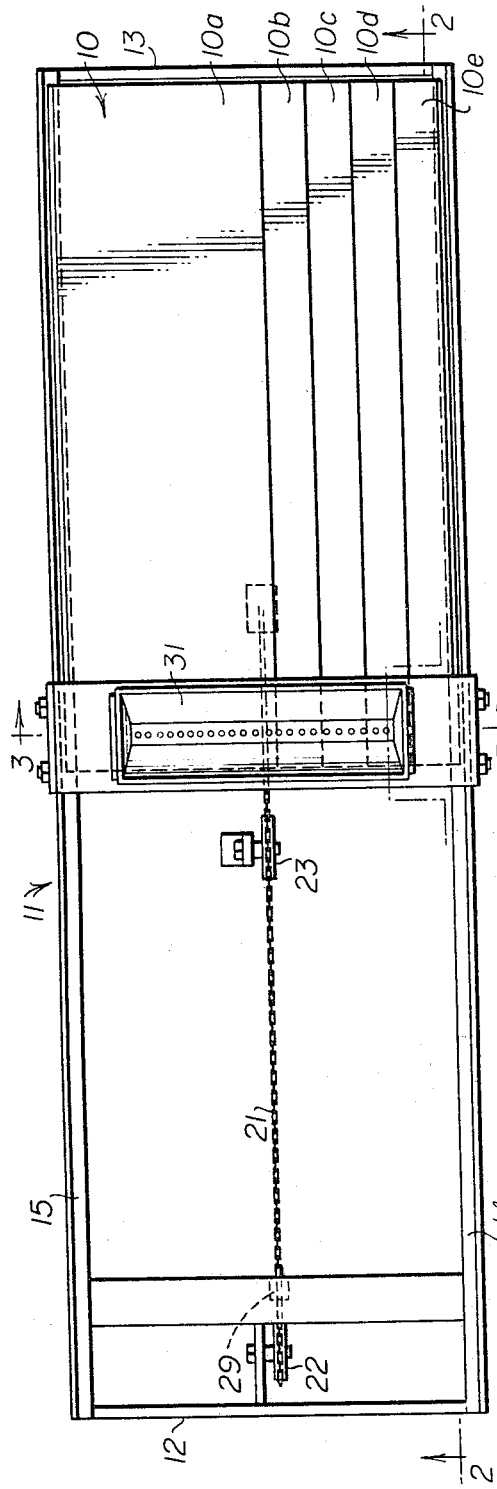
FIG. 1 is a top plan view of a resin-impregnating device showing an assembly of a plurality of flat sheets of fibrous material being preimpregnated.
Figure 2:
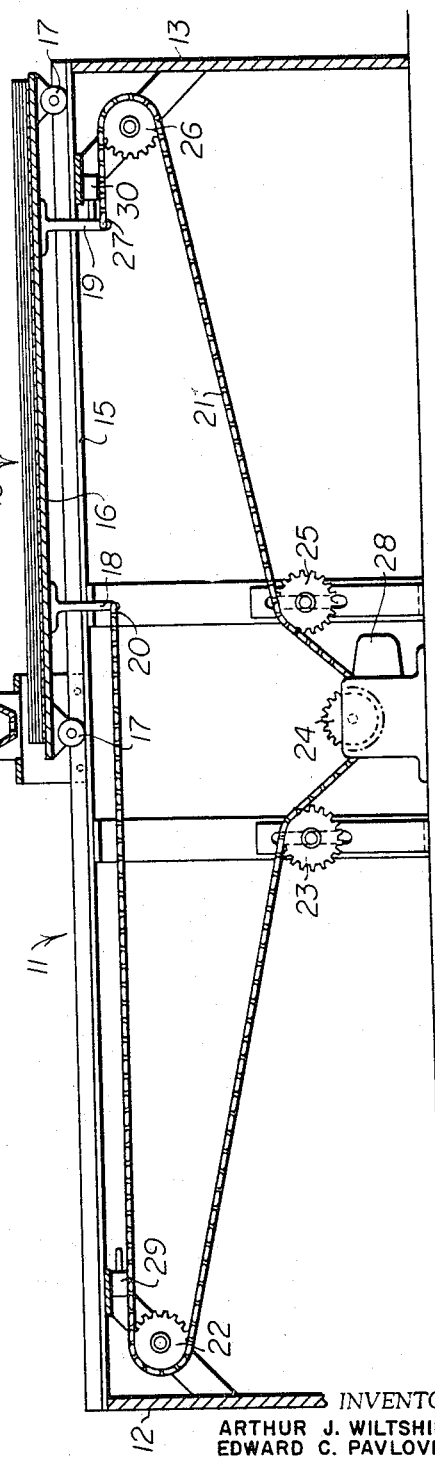
FIG. 2 is a sectional view, the plane of the section being indicated by the line 2—2 in FIG. 1.
Figure 3:
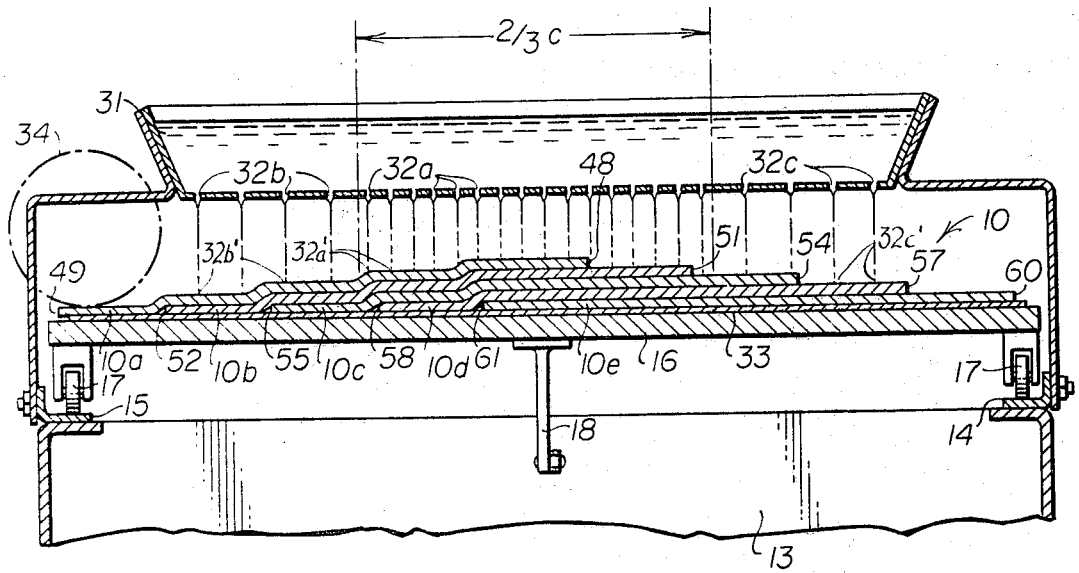
FIG. 3 is a sectional view, the plane of the section being indicated by the line 3—3 in FIG. 1.

In order that the invention may be better understood, reference is made first to FIGS. 1, 2, and 3, which show a matting form 10 being preimpregnated with resin by an impregnating device 11. As is shown particularly in FIGS. 1 and 2, the impregnating device comprises a supporting frame which includes end plates 12 and 13. Parallel track members 14 and 15 are fixed to the upper corners of the plates 12 and 13. A reciprocating table 16 is provided with a wheel 17 at each of its four corners and the wheels 17 are mounted on the track members 14 and 15. Depending pins or fingers 18 and 19 are fixed to the bottom of the table 16 in alignment with the longitudinal axis of the table 16. One end 20 of a drive chain 21 is fixed to the finger 18 and the chain 21 is trained around an idling sprocket 22, which is mounted at one end of the frame, an idling sprocket 23, a drive sprocket 24, an idling sprocket 25, and an idling sprocket 26, which is mounted at the other end of the frame. The other end 27 of the chain 21 is fixed to the finger 19. The idling sprockets 23 and 25 are vertically adjustable to impose a suitable driving tension on the chain 21. A reversing motor 28 drives the sprocket 24 through suitable reduction gears (not shown). The polarity of the motor and, therefore, the direction in which the sprocket 24 is driven by the motor is reversed by reversing switches 29 and 30. The switches 29 and 30 are respectively actuated by the fingers 18 and 19. Thus, as is shown in FIG. 2, the table 16 is at one limit of its stroke and the finger 19 is in contact with the switch 30. Actuation of the switch 30 causes the motor 28 to drive the sprocket 24 in a counterclockwise direction and the table 16 is pulled to the other limit of its stroke with the finger 18 in contact with the switch 29. Actuation of the switch 29 by the finger 18 causes the motor 28 to drive the sprocket 24 in a clockwise direction to return the table 16 to its illustrated position. With the motor 28 running, therefore, the table 16 is repeatedly reciprocated past the centerline of the frame.

A resin trough 31 is mounted above the table 16, transversely to the direction in which the table 16 reciprocates, and midway between the end plates 12 and 13. A multiplicity of openings 32a, 32b, and 32c are provided in the bottom of the trough 31. For reasons that will hereinafter become apparent, two-thirds of the total number of openings are axially spaced apart a distance corresponding to the circumference of the cylinder to be molded, divided by the total number of openings and are symmetrically arranged with respect to the vertical axis of the trough 31. These openings are designated by the reference numeral 32a in FIG. 3. The remaining one-third of the total number of openings are axially spaced from each other and from the axes of the two openings 32a that are the most remote from the vertical axis of the trough 31 a distance corresponding to twice the distance between adjacent openings 32a and are symmetrically arranged with respect to the openings 32a. These openings are designated by the reference numerals 32b and 32c in FIG. 3. The distance between the extreme end openings 32b and 32c, therefore, is:

$$\frac{4c(n-1)}{3n}$$

and the total distance spanned by the openings 32a is:

$$\frac{2c(n-1)}{3n}$$

where:

$c=$ the circumference of the tank to be molded, and
$n=$ the total number of openings in the trough.

It should be noted, therefore, that the openings 32a–32c define a line that approaches but does not equal 1⅓ times the tank circumference. It should also be noted that the openings 32a define a line that approaches but does not equal two-thirds of the tank circumference.

The matting form 10 is placed on the table 16 and comprises a plurality of separately formed, flat layers or sheets 10a, 10b, 10c, 10d, and 10e, such as glass fiber mats, superimposed one on the other in an offset relationship. The particular number of layers selected depends upon the desired thickness of the cylinder. The sheets 10a–10e have a width that substantially corresponds to the circumference of the tank to be molded, and each is offset from an adjacent sheet a distance substantially corresponding to the circumference of the tank divided by the number of sheets. Since the sheets comprise a matting form that is to be formed into a cylinder in a manner that will hereinafter become apparent, the sheets that will form the inner concentric laminations of the cylinder are formed so that they have a width that is less than the outer concentric laminations. Thus, as will also become apparent, the inner laminate of a molded cylinder will be formed by the sheet 10a and the outer laminate will be formed by the sheet 10e. Therefore, the sheets are formed so that they increase slightly in width from the sheet 10a to the sheet 10e. Because of this slight variations in sheet width from concentric laminate to concentric laminate, the edges of the laid-up sheets that will form the inner laminates are more closely spaced on the table 16 than the edges of the sheets that will form the outer laminates.

A thin surface mat 33 may be placed on the table 16 beneath the matting form 10. The mat 33 has a width substantially equal to that of the matting form 10 but is offset slightly outwardly with respect to the sheet 10e A suitable amount of a liquid resin, which is subject to curing or setting by the application of a setting agent such as heat, a catalyst, or both, is poured into the trough 31 and the motor 28 is turned on to start the table 16 and the matting form 10 reciprocating beneath the resin trough. If the cylinder is to be used as a mill roll core, the resin may include a suitable amount of acetylene black as a static eliminator. The resin flows through the openings 32a–32c, and lays down a resin pattern on the form 10 that consists of a multiplicity of parallel lines that are spaced in accordance with the spacing of the openings 32a–32c. The resin pattern which is laid down on the form 10 is illustrated schematically by short lines on FIGS. 3 and 4, and these lines are designated by a primed reference numeral that corresponds to the particular opening in the trough that has produced that resin line. Thus, a resin line 32a′ has been laid down by an opening 32a. It is to be understood, however, that an actual line of resin would be a resin-rich area in the form 10 that progressively diminishes in resin concentration from the zone of the form 10 that is struck by a stream of resin.

When the resin has been drained from the trough 31, the motor 28 is stopped and the resin trough is removed from the impregnating device 11. An expandable mandrel 34 of the character described in aforementioned copending application Ser. No. 63,082, now Patent No. 3,177,105, is placed on the projecting end of the sheet 10a, as is shown in phantom outline in FIG. 3, and is rolled toward the projecting end of the sheet 10e. As the expandable mandrel 34 is rolled over the end of the sheet 10a, the surface mat 33 is picked up as an aid in rolling the entire matting form 10 on to the mandrel. The surface mat 33 also provides a smooth surface on a molded cylinder. After the form 10 has been rolled onto the mandrel 34 in this manner, the assembly is held together by hand or by weak thread ties (not shown) and is inserted into a cylindrical mold casing 35 (FIG. 5).

Figure 5:
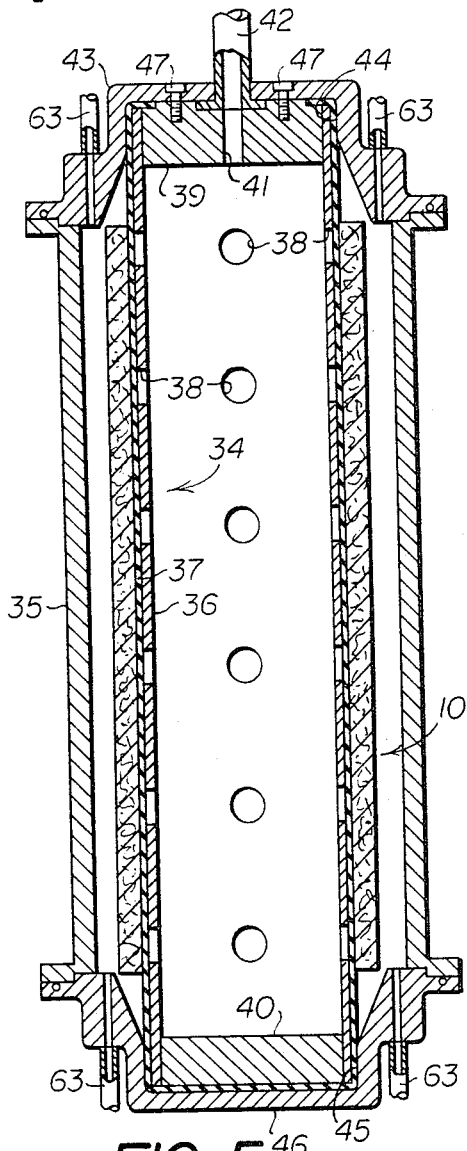
FIG. 5 is a longitudinal cross-sectional view of a molding apparatus showing a pre-impregnated matting form wrapped around an expandable mandrel and illustrating the mandrel inserted within a cylindrical mold.
Figure 6:
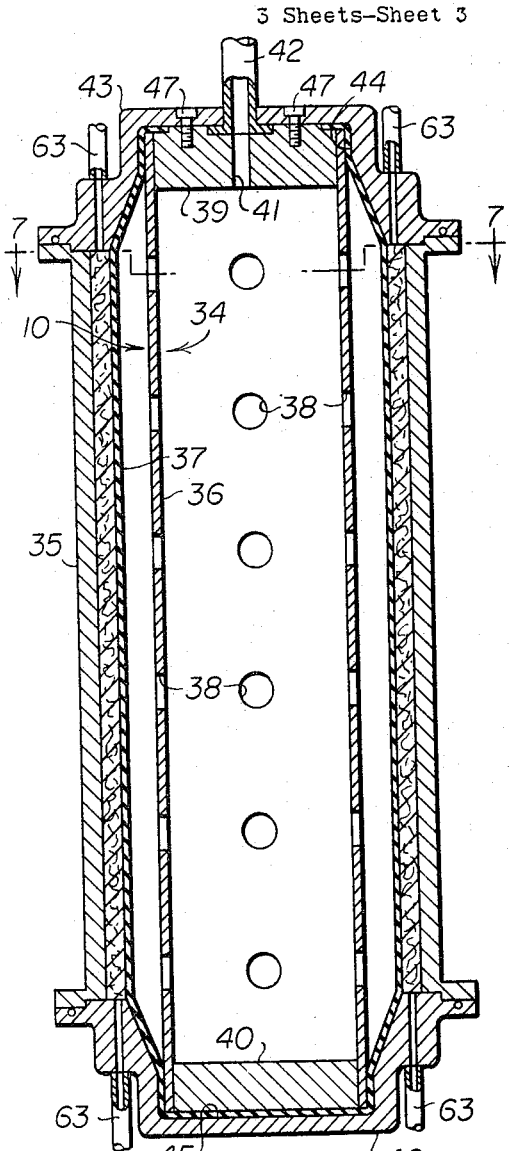
FIG. 6 is a longitudinal cross-sectional view of the molding apparatus shown in FIG. 5 and showing the mandrel in an expanded condition, with the preimpregnated matting form pressed against the surface of the mold.
Figure 7:
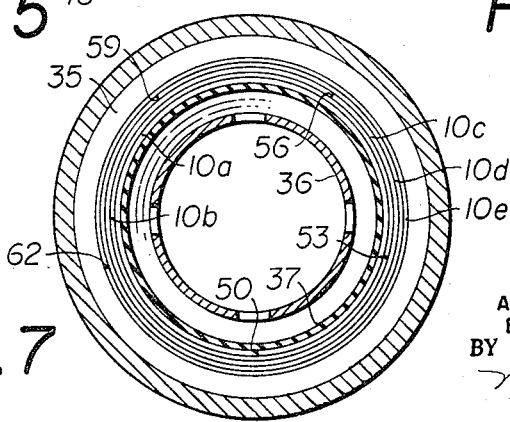
FIG. 7 is a sectional view, the plane of the section being indicated by the line 7—7 in FIG. 6.

As may be seen in FIGS. 5, 6, and 7, the expandable mandrel 34 comprises a cylindrical or tubular core 36 surrounded by a sheath 37 of thin, flexible sheet material. The length of the mandrel 34 is greater than the length of the mold casing 35, while the diameter of the mandrel is such that when the mandrel is collapsed and has been wrapped with the matting form 10, the mandrel and matting form may be inserted in the mold casing with the form 10 spaced from the inner surface of the casing 35 (FIG. 5).

The core 36 may be formed of metal, reinforced plastic, or other suitably rigid material, and is provided with a plurality of holes 38 through the cylindrical wall of the core along its length. The ends of the core 36 are closed by rigid, air impervious plates 39 and 40. As shown, the plate 39 is formed with a central passage 41 and has attached to its outer surface a fluid conduit 42 which communicates with the interior of the core through the passage. The conduit 42 is connected to a suitable source of fluid pressure (not shown).

The edge of the upper, open end of the sheath 37 is clamped between the plate 39 and an upper end casing cap 43. The casing cap 43 is provided with a centrally dished portion 44 which snugly embraces the plate 39 and the top portion of the core 36 and the sheath 37. The bottom of the mandrel 34 is received in a similarly dished portion 45 of a lower end casing cap 46.

Preferably, the mandrel 34 and the upper end casing cap 43 comprises a unitary assembly, with the plate 39 of the mandrel and the casing cap 43 being held in face-to-face clamping contact with the upper edge of the sheath 37 by bolts 47.

Figure 4:
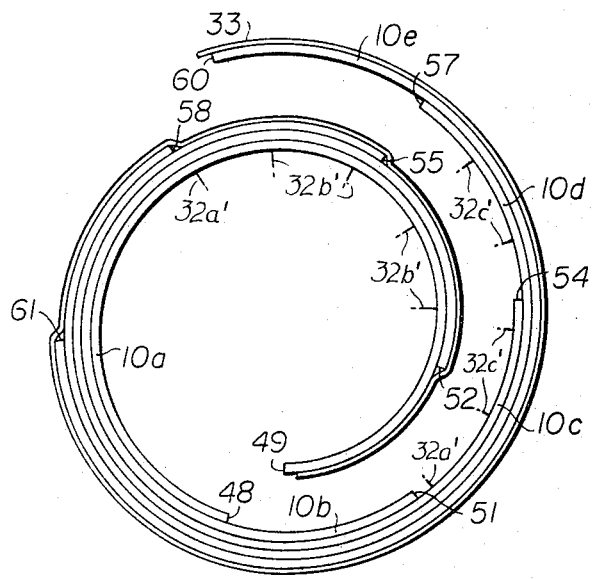
FIG. 4 is an exploded, transverse, sectional view of a cylinder showing the cylinder in a partially unwrapped condition to illustrate seam and resin distribution about the periphery of the cylinder.

With the mandrel 34 and the matting form 10 thus assembled in the mold casing 35 and held in axial alignment with the casing 35 by the dished portions 44 and 45, the mandrel is expanded by introducing fluid through the conduit 42. The fluid flows into the core 36 and then through the holes 38 against the inner surface of the flexible sheath 37. Referring particularly to FIGS. 6 and 7, it will be seen that the expansion of the sheath 37 has acted to expand the wrapped matting form 10 against the inner surface of the mold casing 35. As this expansion takes place, the matting form 10 slides along the overlapped portion of the surface mat 33 until a side edge of each sheet 10a– 10e registers in abutting relationship with its own opposite side edge. Thus, as shown in FIGS. 4 and 7, the edges 48 and 49 of the sheet 10a register to form a butt seam 50; the edges 51 and 52 of the sheet 10b register to form a butt seam 53, the edges 54 and 55 of the sheet 10c register to form a butt seam 56; the edges 57 and 58 of the sheet 10d register to form a butt seam 59; and the edges 60 and 61 of the sheet 10e register to form a butt seam 62. Because of the previously described offset relationship of the sheets 10a–10e, the seams 50, 53, 56, 59, and 62 are equally spaced about the molded cylinder. As the expansion of the matting form 10 takes place, the thread ties, if used, merely break as the matting is expanded.

During this compact operation, the resin may be in the B-stage for ease in handling, having been partially polymerized prior to the wrapping operation. The mandrel is further expanded after the edges of the sheets have mated to compact the matting form 10 against the mold surface and to cause the resin to uniformly permeate the fiber lining. As the mandrel is expanded during the compacting and impregnating of the fiber lining, the air trapped in the mold and in the matting form 10 is expelled through ducts 63 at the top and bottom of the mold. The ducts 63 may be then capped after final expansion of the mandrel 34 and the resin set with heat by any conventional method to complete the molding of an The previously described location of the resin lines $32a'$, $32b'$, and $32c'$ insures an even resin distribution in the molded cylinder and a rapid resin saturation during the compaction step. As may be seen in FIGS. 3 and 4, five sheets of mat between the edges 48 and 61 receive a maximum amount of resin from the trough 31. Four sheets of mat on either side of this five-sheet layup (the sheets between the edges 58 and 61 and between the edges 48 and 51, respectively) each receive the same amount of resin as the five-sheet layup, but the excess resin in the four-sheet layups is absorbed by the dry portion of the mats between the resin line $32c'$ and the edge 60 and the dry portion of the mats between the resin line $32b'$ and the edge 49. It should also be noted that, since the openings 32a are spaced along a line that approaches but does not equal two-thirds of the circumference of the molded cylinder, and since the openings 32b and 32c are spaced along lines, each of which approaches but does not equal one-third of the circumference, the resin lines $32a'$, $32b'$, and $32c'$ are all equally spaced around the cylinder when the seams are registered with the resin lines $32b'$ and $32c'$ alternating. In the illustrated embodiment, a single resin line, therefore, is not required to permeate more than three additional mat layers when the form 10 is compacted in the mold, thus reducing the time for uniform and thorough resin impregnation in the mold.

Obviously, many modifications and variations of the invention will become apparent to those skilled in the art in the light of the above teachings. Therefore, it is to be understood that, within the spirit and scope of the appended claim, the invention may be practiced otherwise than as specifically shown and described.

What is claimed is:

1. A molded, fiber-reinforced, resin-impregnated mill roll core, comprising a cylindrical wall made up of a plurality of concentric laminations of fibrous reinforcing sheets integrally bonded to each other, said sheets being uniformly impregnated with a settable resin having a conductive material dispersed therein, each of said sheets having an edge-to-edge dimension substantially equal to the circumference of the cylindrical wall in the lamination formed by that sheet and each of said sheets forming separate edge seams by abutment of an axially extending edge of each sheet with its own opposite parallel edge, said seams in the plurality of laminations being circumferentially spaced an equal distance within said cylindrical wall and being radially offset from the seam of an adjacent laminate by a constant distance.

References Cited

UNITED STATES PATENTS

| | | | |
|---|---|---|---|
| 651,425 | 6/1900 | McConnell | 138—151 |
| 1,284,295 | 11/1918 | Frederick | 138—151 XR |
| 1,892,607 | 12/1932 | Bundy | 138—151 XR |
| 2,209,402 | 7/1940 | Kepler | 138—151 XR |
| 2,360,830 | 10/1944 | Denman | 138—141 |
| 2,768,920 | 10/1956 | Stout | 138—141 XR |
| 2,848,151 | 8/1958 | O'Neil | 138—141 |

LAVERNE D. GEIGER, *Primary Examiner.*

B. KILE, *Assistant Examiner.*

UNITED STATES PATENT OFFICE
CERTIFICATE OF CORRECTION

Patent No. 3,395,735                                                            August 6, 1968

Arthur J. Wiltshire et al.

It is certified that error appears in the above identified patent and that said Letters Patent are hereby corrected as shown below:

Column 6, line 13, after "molding of an" insert -- open end cylinder. --.

Signed and sealed this 27th day of January 1970.

(SEAL)
Attest:

Edward M. Fletcher, Jr.                          WILLIAM E. SCHUYLER, JR.
Attesting Officer                                       Commissioner of Patents